United States Patent

Suzuki

[11] Patent Number: 5,825,917
[45] Date of Patent: Oct. 20, 1998

[54] REGION-BASED IMAGE PROCESSING METHOD, IMAGE PROCESSING APPARATUS AND IMAGE COMMUNICATION APPARATUS

[75] Inventor: Nobuya Suzuki, Kitasoma-gun, Japan

[73] Assignee: Sanyo Electric Co., Ltd., Osaka, Japan

[21] Appl. No.: 533,945

[22] Filed: Sep. 26, 1995

[30] Foreign Application Priority Data

| Sep. 30, 1994 | [JP] | Japan | 6-237169 |
| Jun. 13, 1995 | [JP] | Japan | 7-146507 |
| Jul. 11, 1995 | [JP] | Japan | 7-174717 |
| Jul. 12, 1995 | [JP] | Japan | 7-199024 |

[51] Int. Cl.$^6$ .............................. G06K 9/00; G06K 9/34
[52] U.S. Cl. .......................... 382/164; 382/166; 382/253
[58] Field of Search ................................... 382/162, 164, 382/165, 166, 167, 191, 197, 199, 241, 242, 253, 286; 358/518, 520; 395/131, 135; 345/153, 155

[56] References Cited

U.S. PATENT DOCUMENTS

| 4,189,711 | 2/1980 | Frank . | |
| 5,459,513 | 10/1995 | Oddou | 382/199 |
| 5,473,736 | 12/1995 | Young | 358/518 |
| 5,524,064 | 6/1996 | Oddou et al. | 382/242 |
| 5,557,688 | 9/1996 | Nakamura | 382/164 |

FOREIGN PATENT DOCUMENTS

| 164825 | 12/1985 | European Pat. Off. . |
| 301207 | 2/1989 | European Pat. Off. . |

OTHER PUBLICATIONS

T. Vlachos, "Graph–Teoretical Approach to Colour Picture Segmentation and Contour Classification", IEEE Proceedings–I, vol. 140, No. 1, Feb. 1993.

Godfrey et al., "Applying Neural Networks to Colour Image Data Compression", IEEE Region 10 Conference, Tencon 92, pp. 545–549, Nov. 1992.

*Primary Examiner*—Phuoc Tran
*Attorney, Agent, or Firm*—Loeb & Loeb LLP

[57] ABSTRACT

Image recognition, extraction, and data compression is carried out on the basis of colors. There are provided a judgment section 14 for judging a color difference between a color of each pixel constituting an image and each element of a color table; an image replacement section 16 for replacing, in accordance with the result of judgment, the color of each pixel with an element, among elements of the color table, which minimizes the color difference relative to the color of the each pixel; and a pixel integration section for integrating the adjoining pixels after the replacement, if colors of pixels positionally adjoining in an original image are contained in regions adjoining in a divided color space. A single color replaced with an element of the color table is imparted to a group of pixels integrated by the pixel integration section 18.

29 Claims, 12 Drawing Sheets

|   | 1 | 2 | 3 | 4 | 5 | 6 | 7 | 8 | 9 |   |
|---|---|---|---|---|---|---|---|---|---|---|
| 0 | a | a | a | b | b | b | b | b | b | c | L0 |
| 1 | a | a | b | b | b | b | b | b | b | c | L1 |
| 2 | a | a | b | b | b | b | b | b | c | c | L2 |

SCANNING DIRECTION →

Fig. 12

SCANNING DIRECTION →

REGION-BASED IMAGE PROCESSING METHOD, IMAGE PROCESSING APPARATUS AND IMAGE COMMUNICATION APPARATUS

BACKGROUND OF THE INVENTION

1. Field of the Invention

The present invention relates generally to an image processing method, an image processing apparatus and an image communication apparatus, and more particularly to an image processing method for compressing image data in accordance with a color of each portion of an image and to an image communication apparatus for transmitting and receiving image data compressed by the method.

2. Description of the Prior Art

With recent diffusion of information terminal or amusement equipment into homes and shops, there is increasing demand for a technique to implement high-speed transmission of color images. An example of such a technique is a video-on-demand system in which a central station provides any movie or the like upon request from a viewer. It is envisaged that in the image transmission, the preciseness and sharpness of the image to be transmitted is almost always incompatible with the transmission rate. If the preciseness and the speed were simultaneously dealt with satisfactorily, there would be necessary to increase the communication bandwidth. On the contrary, although a precise and sharp image is not as important as a natural image, some applications require low-cost and a large volume of data transmission, using an existing line such as a telephone line. Description herein will mainly be given of the latter application.

[Conventional Example 1]

In the case of image transmission through a low bit rate line, data are often compressed for transmission. An existing simple data compression method may be one in which images are temporarily divided into a plurality of matrix-like blocks so as to extract low-frequency components of each block. An image transmitter has only to transmit block numbers and the low-frequency components of blocks associated therewith. A lower number of blocks can further decrease the time taken for the transmission of one image. The number of blocks may be determined in view of the preciseness and sharpness necessary for the image to be transmitted, that is, image quality, and the time taken for the transmission. Despite the fact that it is a simple method, a certain effect can be expected. [Conventional Example 2]

As will be described later, the conventional example 1 will entail a problem of deterioration of the image quality. A typical method for solving this deficiency and digitally processing the image is, for instance, an image segmentation method (i.e. an image dividing method into a plurality of regions) utilizing histogram processing. This segmentation method changes gray level information of each pixel depending on the frequency of its appearance. A cumulative frequency diagram representative of gray level information of each pixel of an image is temporarily prepared, with its frequency axis being equally divided so as to correlate with a full-scale dynamic range of the image processing apparatus. This technique is also the called contrast enhancement method. In this technique, a high frequency gray level is finely divided, whereas a lower frequency gray level is roughly divided, so as to be classified into several gray levels. This technique allows significant components among the gray level information of a region to be enhanced, and deletes data in the other portions to thereby compress the data.

The above conventional examples involve the following problems.

[As to Conventional Example 1]

Should a border of an image be contained in a block, the image obtained by restoring the block might be greatly different from the original image.

FIG. 1 illustrates an image of a ship 3 floating on the sea 1. Now suppose that the data of the portion of the block 5 are compressed. The block 5 contains a border between the ship 3 and the sea 1. Assuming that the color of the sea 1 is blue, with the color of the ship 3 being read, the color of the block 5 would be averaged, resulting in purple. As is easily conceivable, the contour of the ship 3 is surrounded by a belt of color which is not to be seen in the original image, resulting in an unnatural image. The deterioration of the image in units of block is called "block distortion", which will be a serious deficiency of the conventional example 1.

[As to Conventional Example 2]

Depending upon the manner of utilization, this segmentation method will allow considerably highly accurate image processing and data compression. However, during the dividing processing, it would be necessary to perform a tremendous amount of calculation for each image. In the event that the histogram involves bias errors or the image has an extremely narrow dynamic range (e.g., space image), modulation of the frequency distribution would be necessary after the transform. Such processing is required for each image, burdening the computer to a great extent. Thus, the segmentation method using histogram processing will not satisfy the demand to precess the mass of data at a low cost.

SUMMARY OF THE INVENTION

It is therefore the object of the present invention to provide a region-based image processing method and apparatus intended to compress image data by dividing an image into units of regions having analogous colors, instead of dividing the image into matrix-like blocks (namely, positional coordinates) and to provide an image communication apparatus intended to transmit and receive the image data processed by use of the image processing apparatus. Disclosed is an image processing apparatus of a type minimizing computer processing required and superseding an image segmentation apparatus of a type minimizing computer processing required and superseding an image segmentation apparatus using histogram processing or the like. A image processing method according to the present invention is a method of processing images on a region basis, which comprises a judgment step of judging an approximation between a color of each portion of an image to be processed and standard element colors prepared in advance; a replacement step for replacing, in accordance with the result of the judgment, the color of each portion with an element color; and an integration step for integrating, after the replacement, regions subjected to the replacement. A single color replaced again with an element color by the judgment step and the replacement step is imparted to the thus integrated portions. Each portion may be each pixel, or an aggregate of pixels. The element color is contained in, for instance, a color table. Approximation is judged by, for instance, a color difference.

First, the color of each portion of the image is replaced with one of the element colors. For example, the color of each pixel is replaced with an element, among the elements of the color table, which minimizes the color difference relative to the color of the each element. Even though the original image contained 10000 colors, the image will be represented by 100 colors, if the number of the element colors is 100. After the replacement, if the colors of the pixels positionally adjoining in the original image are contained in the regions adjoining in the divided color space, then these pixels may be integrated. When an image has been represented by 100 colors, by way of example, the adjoining pixels or regions (each having a different color in the original image) may possibly be represented by the same element color. In this case, these pixels or regions are integrated into a single region. Also in the event that the adjoining pixels or regions are represented by the element colors extremely similar to each other (but slightly different from each other), these pixels or regions may be integrated. In this instance, an element color which was possessed, before integration, by either pixel or region, is imparted to the post-integration region.

This method further comprises a color table creation step for extracting, upon the completion of the replacement and integration steps, elements of the color table which are necessary to represent the final image, to create another color table. In the above example, a color table composed of 100 colors is created.

In an image communication apparatus according to the present invention, the transmitter includes transmission means for transmitting a color table to the receiver, while the receiver includes storage means for storing the color table received. That is, the color table is transmitted from the transmitter to the receiver, the latter storing the color table. Previous to the communication of image data, the transmitter and receiver are allowed to include a common color table. Due to the fact that the same color table is used, the transmitter thereafter only has to transmit color numbers. The receiver reproduces original colors referring to the color numbers and the color table.

In another aspect, the transmitter includes decision means for deciding, depending on the significance of a region, the transmission frequency of the data in that region. The receiver includes reproduction means for combining data in units of regions transmitted form the transmitter to reproduce an image. Depending on the significance of a region, the transmitter decides the transmission frequency of data in that region, whereas the receiver combines the data in units of regions transmitted from the transmitter, to thereby reproduce an image. A significant region includes, for instance, a region having a larger are, or a region corresponding to a human face. Increase of such transmission frequency will ensure, for instance, the avoidance of absence of significant information arising from transmission error.

According to the image processing method of the present invention, the thus integrated region is coded by the information on the border lines between regions, not by the information on the peripheral line for each region, whereby any double definition of a boundary is avoided.

The method comprises the steps of scanning an image in a given direction; detecting, on a scanning line, a plurality of border points constituting a border between regions; and joining the plurality of border points detected to generate border lines. The information on image regions is coded in accordance with information on the generated border lines.

An image processing apparatus of the present invention is an apparatus for coding images on a region basis, which comprises means for inputting an image; means for scanning, in a given direction, the input image; means for detecting, on a scanning line, a plurality of border points between image regions; and means for joining the plurality of border points detected to thereby generate border lines. The information on the image regions is coded in accordance with information on the generated border lines.

BRIEF DESCRIPTION OF THE DRAWINGS

FIG. 12 is a diagram showing color numbers of pixels lying on lines L1 to L3 of an input image;

DESCRIPTION OF THE PREFERRED EMBODIMENTS

Embodiment 1

A preferred exemplary embodiment of an image processing method of the present invention will now be described with reference to FIGS. 2 to 5.

Figure 1:
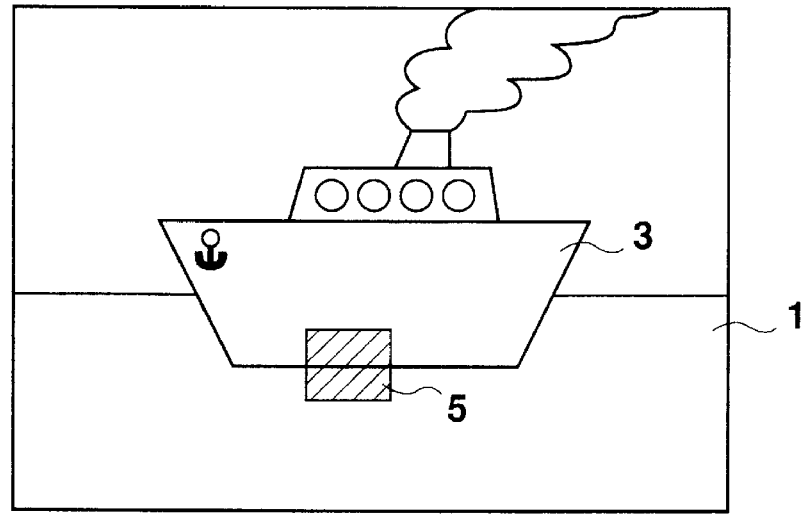
FIG. 1 is a view of an image of a ship 3 floating on the sea 1.
Figure 2:
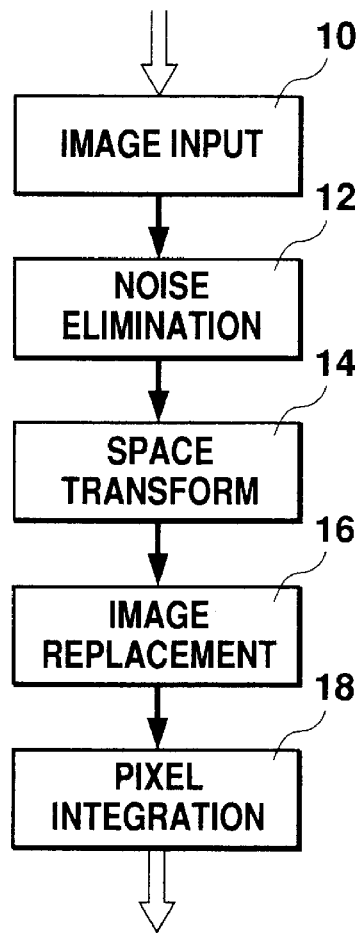
FIG. 2 is a diagram depicting a schematic configuration of an apparatus for executing an image processing method according to the present invention.

Referring first to FIG. 2, there is schematically depicted a configuration of an image processing apparatus intended to carry out the method. The apparatus comprises an image input section 10 for the input of an image; a noise elimination section 12 constituted of a low-pass filter to eliminate noise which may be mixed into the image input; a space transform section 14 for transforming the scale of the image cleared of noise by the noise elimination section 12 from RGB color space to HVC uniform color space, which will be described later; an image replacement section 16 for replacing the image transformed by the space transform section 14 with elements present in a color table to be described later; and an image integration section 18 for integrating pixels positionally adjacent and approximate in color to one another in the original image, among the pixels of the image replaced by the image replacement section 16.

Description will now be given of the HVC uniform color space to be transformed from the RGB color space by the space transform section 14.

Figure 3:
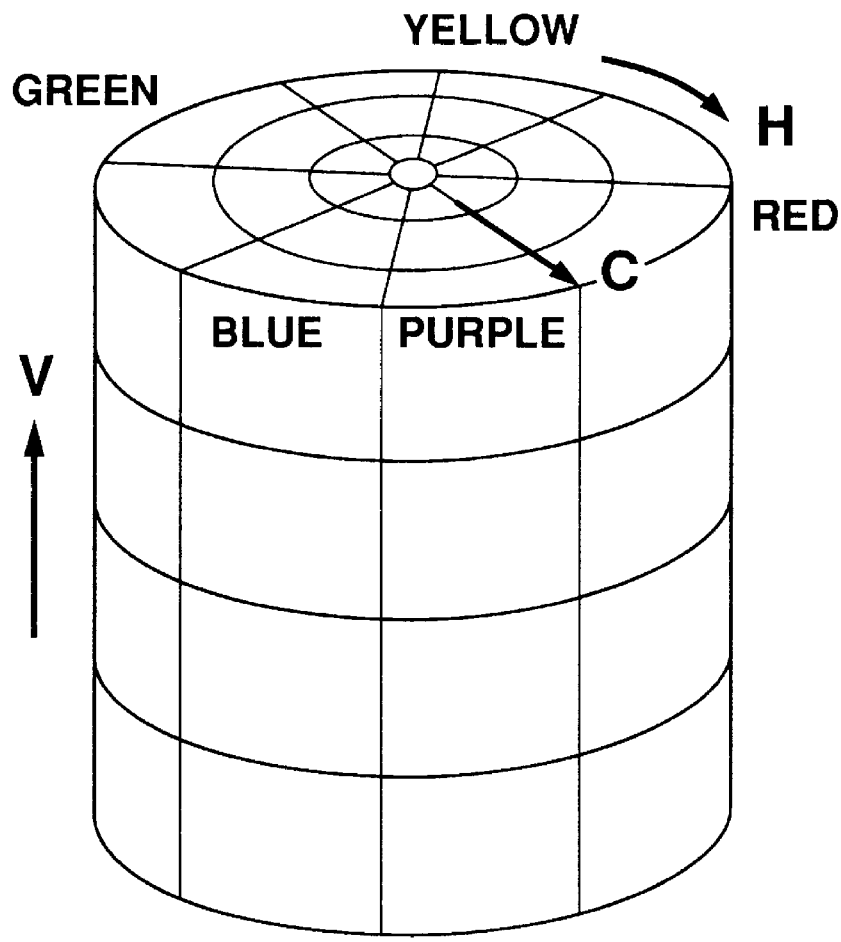
FIG. 3 is a view of an HVC uniform color space.

Referring to FIG. 3, there is illustrated a configuration of the HVC uniform color space. As is well known, the HVC uniform color space is a cylindrical color space for classifying colors with Hue in its rotational direction, Value in its height direction, and Chrominance in its radial direction, which can be obtained from the RGB color space through a known transform. The HVC uniform color space is characterized in that it allows an easy intuitive recognition by human visual sensation compared with the RGB color space. Colors corresponding to two points lying in close proximity to each other in the HVC uniform color space will be recognized by human beings as colors analogous to each other. As will be described later, a plurality of colors contained within a certain are of this space are replaced with a single color, thereby making it possible to accomplish data compression, which is the final goal.

This action will be explained.

An image to be processed is fed through the image input section 10 to the apparatus. Due to a relatively arbitrary noise component which may be generally contained in the image, the noise elimination section 12 is provided to eliminate the noise. Then the space transform section 14 serves to transform this image from the RGB color space to the HVC uniform color space. Besides the execution of this transform, the space transform section 14 will divide the post-transform HVC uniform color space into a plurality of regions to prepare a color table in advance. For instance, the HVC uniform color space is divided for use into forty segments in the directions H, V, and C, respectively. Thus the color space will be divided into 40×40×40=64000 regions. An average color for each region is defined as a color presentative of that region. This will result in 64000 representative colors, which are sufficient to represent an image close to a natural image.

Using the representative colors as elements, the space transform section 14 creates the color table. The representative colors as elements of the color table can be individually specified by numbers 1 to 64000, which means that all the colors can be identified by 16-bit data.

The image replacement section 16 acts to replace the color of each pixel of the image to be processed with any one of color numbers 1 to 64000. In spite of the fact that there are 64000 colors it would be impossible for the color of each pixel to completely coincide with any element in the color table since each pixel has an arbitrary color. Thus the image replacement section 16 will measure a color difference between each pixel and each element in the color table and will employ, as the color for replacement of that pixel, the element which minimizes the color difference. It is to be noted that for replacement, such an element that has a color difference lying within a predetermined range might also be employed. This is due to the fact that although it is desirable to search for an element minimizing the color difference, this would require a certain calculation time. In any case, as a result of the replacement, a complete representation of the image to be processed will be accomplished by the color numbers 1 to 64000.

Figure 4:
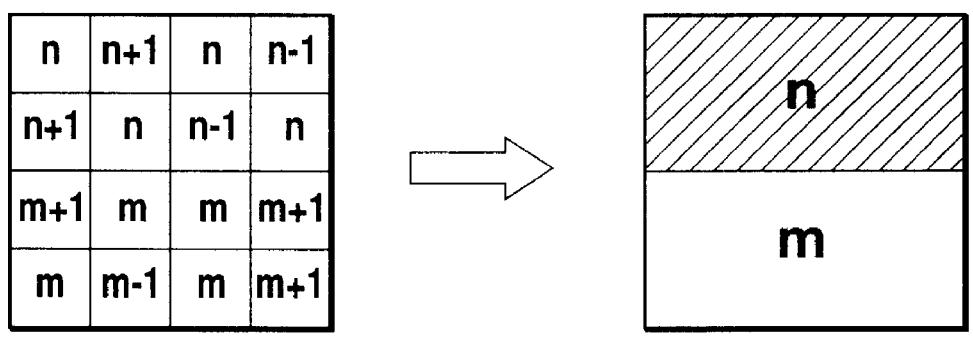
FIG. 4 is a diagram showing sixteen pixels by enlarging an image to be processed.
Figure 5:
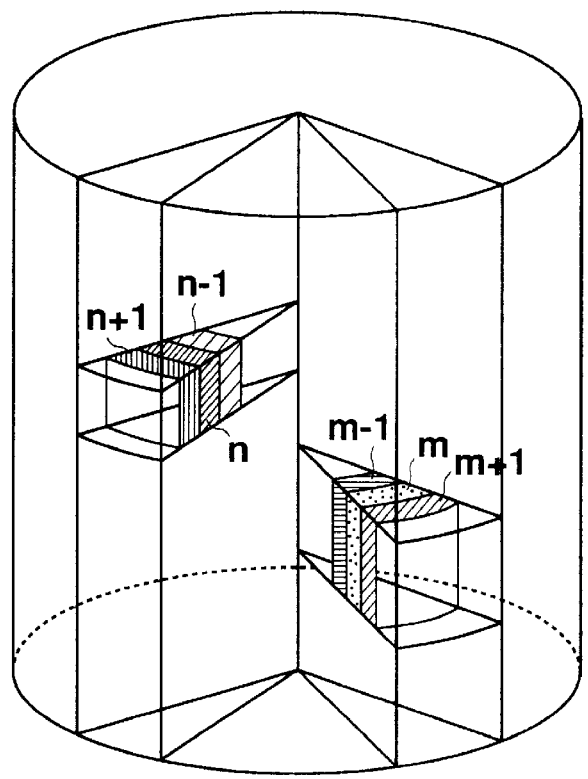
FIG. 5 is a diagram illustrating a relationship of positions, in the HVC uniform color space, taken by color numbers of the sixteen pixels of FIG. 4.

The thus obtained image in an intermediate processing state is integrated and compressed by the image integration section 18. FIG. 4 depicts in an enlarged scale 16 pixels present in a part of an image to be processed. FIG. 5 depicts a relationship of positions in the HVC uniform color space to be defined by the color numbers corresponding to these 16 pixels.

In FIG. 4, color numbers allocated to 8 pixels lying in the upper half (which will be hereinafter referred to as "pixel group A") of the 16 pixels will be any one of $$n-1, n, n+1$$

while color numbers allocated to 8 pixels lying in the lower half (which will be hereinafter referred to as "pixel group B") will be any one of $$m-1, m, m+1.$$

As can be seen from FIG. 5, the elements having contiguous color numbers directly adjoin to one another in the HVC uniform color space. It is therefore envisaged that the pixel groups A and B are respectively composed of substantially the same colors. Thus, the pixels belonging to the pixel group A are integrated as having the same color number n, whereas the pixels belonging to the pixel group B are integrated as having the same color number m. Over the entire image, the pixel integration section 18 performs such integration processing to consequently integrate all regions. The above processing will complete the data compression.

It is to be appreciated in this apparatus that due to the fact that there are as many as 64000 color numbers, it is possible to integrate all pixels having color numbers varying within a certain range in addition to the pixels having the contiguous color numbers. These pixels can be subjected to integration as long as they are located within a certain region without being limited to the case where they are adjoined to one another in the original image. The range to be integrated depends upon the data compression rate and image quality required.

In this apparatus, the color table has been prepared by the space transform section 14, although the table may be disposed externally of the apparatus. In this case, the external table is referred to if necessary.

According to the image processing method of the present invention, the minimum unit for image data integration is a pixel so that any adjoining pixels having significantly different color numbers are not integrated, which will successfully avoid the block distortion involved in the conventional example 1. The advantage of the present invention over the conventional example 1 arises from the intrinsic difference therebetween, namely that the data compression in the conventional example 1 relies upon only the positional information of the original image whereas in the present invention the data are compressed depending on the color information. Thus, less calculation is required for the region integration, which will overcome the problem entailed in the conventional example 2.

Moreover, the execution of image data integration by this apparatus will ensure not only the data compression but also the extraction of a pixel region having approximate colors in the color space. This apparatus can also be used as an image recognition apparatus. Due to the ability of this apparatus to use not the RGB color space but a color space, such as the HVC uniform color space, which gives a natural classification to human visual sensations, it is possible to conveniently execute recognition and analysis.

Embodiment 2

Description will now be given of an image communication apparatus intended to perform transmission and reception of compressed image data using the image processing method of embodiment 1.

Figure 6:
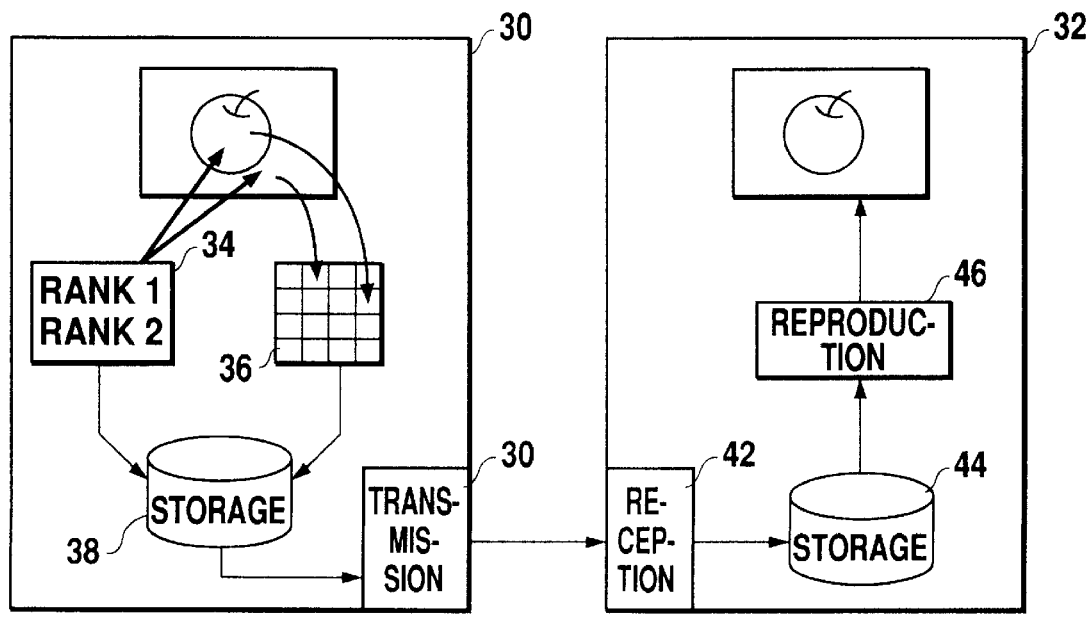
FIG. 6 is a diagram depicting a configuration of an image communication apparatus according to a second embodiment.

Referring to FIG. 6, a configuration of the image communication apparatus according to a second embodiment is depicted.

The image communication apparatus comprises an image transmitter 30 and an image receiver 32, both making use of the image processing method of the present invention. The image transmitter 30, in particular, employs the method which is improved as follows. That is, in order to ensure communication security upon transmission of compressed image data, the image transmitter 30 is provided with a significance assignment section 34. The image transmitter 30 further includes a color table creation section 36 which creates a new color table by extracting color table elements necessary for the representation of the final image after the completion of the region integration by the pixel integration section 18. The significance and the color table are temporarily stored in a storage section 38 and then transmitted through a transmission section 40 to the image receiver 32. Through a reception section 42, the image receiver 32 receives the data and temporarily stores them in a storage section 44. Afterwards, the data are fed to a reproduction section 46 for reproducing the image.

The state of image data transmission and reception will be explained.

In the same manner as the first embodiment, the image is processed by the image transmitter 30. The color table creation section 36 then extracts all colors used in the final image to create a new color table. The color table thus created is transferred, prior to the transmission of the image data, to the image receiver 32. As a result, the image transmitter 30 and the image receiver 32 are allowed to share the color table which is necessary and sufficient for the reproduction of the image to be subsequently transmitted.

The significance assignment section 34 judges the significance of each region of the region-integrated final image and issues a priority upon transmission. This is a measure taken to minimize data loss in the least significant part when an unexpected situation has occurred, such as data loss in a communication channel. The significance assignment section 34 will, for example, assign a higher priority for the region having a larger area. The priorities associated with the regions are stored in the image transmitter 30, and a number indicating the number of finest repeat transmission for the region having a higher priority in the transmission will be set at a larger value. This will ensure repeated transmission in accordance with the priority and should the communication channel suffer from a deficiency, it will make it possible to avoid to the utmost, the situation where a large region may be lost when the image is reproduced in the image receiver 32.

The above is a summary of the image communication apparatus according to this embodiment.

It is to be particularly noted that the criteria for assigning the priorities by the significance assignment section 34 is not limited to the size of the regions. For instance, depending on its application, higher priority may be assigned to a region to be clearly seen by human eyes due to its color number being largely different from the other regions, or a region having a high brightness. In an application associated with an image mainly including a human face, such as a visual telephone in particular, it is preferable that a flesh colored region lying in the center of the screen, or a region which seems to be eyes or a mouth within the flesh colored region, should be subjected to processing for, e.g., raising the priority.

According to the image communication apparatus of the present invention as described hereinabove, the transmission and reception of the image data can be executed while simultaneously avoiding the absence of any significant region. In this case, due to the fact that both the transmitter and receiver can share a color table necessary and sufficient for the reproduction of the image to be transmitted, the apparatus will be appropriate to meet the demand for the transmission of more definite information through a low bit rate line and will be superior in practical use.

Embodiment 3

Description will be given of an image processing method allowing the use of image region integration method of the first embodiment. In this embodiment, the image regions are integrated in sequence. More specifically, the method of the first embodiment is applicable to process A which will be described later.

[BACKGROUND]

As is represented by MPEG, image coding is one of the important basic techniques when considering the implementation of next-generation image receiving equipment or various image communication services. It provides high-quality and more natural image information with a limited transmission rate, while ensuring the improvement in coding efficiency or image compression rate.

Discrete Cosine Transformation (DCT) is one example of such MPEG coding techniques. In this technique, an image is divided into a plurality of matrix-like blocks. In the simplest example, a low-frequency component is extracted from each of the blocks, and the colors of pixels contained in each block are uniformly replaced with, e.g., one typical color. Thereafter, the block numbers are correspondingly paired with the respective typical colors to complete coding.

Among the increasing number of image-associated techniques a technique for correctly grasping and predicting the motions of dynamic images to code them (hereinafter referred to simply as "motion coding") has particular significance. One of the goals of image coding techniques is to enable application to domestic devices such as personal information appliances. Requirements in this case are that dynamic images are transmitted in real time within a range of a low transmission rate and that the images obtained by decoding them have sufficiently high quality. In order to meet these requirements, it would be inevitable to perform motion coding.

[PROBLEMS]

Since the MPEG coding technique described above has been developed solely for implementable applications such as large scale integration circuits (LSI) using the existing techniques, it seems difficult to directly apply it to the implementation of improved motion coding at present. MPEG allows motion vectors of the blocks to be transmitted while performing the image coding for each block, and the motion vectors are all calculated for each block irrespective of the contents of the images. This means that all the objects within the image will be uniformly represented by using blocks of the same size. Information representing differences between the original image and produced image is indispensable for this method. However, due to too large a proportion ordinarily occupied by the differential information, it was naturally difficult for sufficient image information to be transmitted with a low bit rate line.

[OBJECT OF THIS EMBODIMENT]

The object of the present invention is to identify and solve a problem. The applicant (1) regards the absence of a research seeking to effectively apply the segmentation method to motion coding as a problem, and (2) taking into consideration that the DCT based coding of motions may have limitations due to a low compression efficiency and poor region-to-region matching efficiency, which will be described later, (3)discloses a region-based image region integration method in view of advanced motion coding.

[SOLUTION]

In a method of integrating image regions of this embodiment, a plurality of region integrating criteria capable of being repeatedly used are combined to progress the integration of regions. The phrase "capable of being repeatedly used"means that the use of one criterion is followed by the use of another criterion, and thereafter the initial criterion is repeatable. The term "integrating" or "integration" means that a plurality of regions are integrated into a single region. The term "image region" means a region composed of pixels having some common nature. The image region may be composed of a single pixel, in short, the minimum unit of the image region is a pixel.

This embodiment includes a process A in which image regions are integrated on the basis of individual pixel information; and a process B in which image regions are integrated on the basis of aggregate pixel information. The individual information refers to information capable of being defined only be individual pixels such as pixel colors, whereas the aggregate information refers to information capable of being defined by the aggregate of a plurality of pixels, such as geometry of the region. Although in process A the integration is executed based on the individual information, a plurality of actual pieces of individual information for a plurality of pixels may be collectively dealt with as long as the integration is based on the individual information. To take an example, the average of colors of a plurality of pixels may form the basis of the integration.

In this embodiment, the above individual information may be the color information for each pixel, and the above aggregate information may be the size of the image region. The term "color information" includes the information for all of the factors relating to light impinging upon the human retinae as a result of optical reflection, and may be information on any one of brightness, chrome and hue, which are attributes of colors. The actual form of information can be, for instance, color numbers in HVC or RGB color space. This configuration will allow the image regions to be integrated from two viewpoints, that is, the color information and the size.

In this embodiment, the process A and the process B are carried out in this order. Accordingly, by way of example, integration initially progresses using the color information, and then the regions remaining after the integration will be integrated according to size.

In an aspect of this embodiment, the color information is a color difference among regions, the process A allowing a plurality of regions positionally adjoining one another to be integrated in sequence from one having a low color difference, namely, in ascending order of color difference. The color difference is the degree of difference in color, and a larger color difference will result in a larger difference in color. The reason that the criterion "positionally adjoining one another" is defined is that there is a high possibility that these regions might be contained in one physically defined entity (object). The same will apply to the criterion to be "from one having a low color difference." With a red apple including upper and lower ends, each having a subtly different color from the other, it is envisaged that a color difference between two ends is generally small since their colors belong to the same red, and that a distance between the two ends is relatively small in the image, thus allowing the entire apply to be integrated into one region. Even though in this case a glass having substantially the same color as the apple is disposed separately in the image, the integration would not be performed as long as they are separated from each other to some extent.

In another aspect of this embodiment, the process B allows a region having a smaller area to be integrated in sequence into another region having a larger area and located in close proximity thereto. This is due to the fact that in view of region matching to be performed upon the motion coding, information is significant with respect to the region having a relatively large area in the image, which needs to be formed as early as possible. This aspect would cause the regions having a relatively small area to successively disappear, and would reduce the total number of regions contained in the image.

In a further aspect of this embodiment, the process A continues until the minimum color difference among the regions reaches a predetermined reference value, and is subsequently succeeded by the process B. With execution of the process A, the color difference will diminish gradually among the regions. In this case, by way of example, the process A will continue until the color difference reaches 6.0 in the unit called NBS color difference. Afterwards, the regions thus integrated will be subjected to further integration based on dimensions.

In a still further aspect of this embodiment, the process A is executed until the number of regions having a predetermined dimensions reaches a certain value, and is subsequently succeeded by the process B. With the progress of the process A, not only the minimum color difference but also the number of regions will diminish, the region itself being enlarged by the integration. For instance, the process A may be stopped when about 10 regions have appeared having dimensions of 1% of the full image size.

It is to be appreciated in this embodiment that with respect to a region entirely surrounded by a single region (hereinafter, referred to as an "isolated region"), the integration by the process B may be delayed. In this case, the dimensions of the isolated region may in principle be omitted from consideration. Although ordinarily the isolated region may not have so large a size, there may be a case where it is envisaged that the isolated region is of importance as the image information, such as eyes in a human face. Thus, the process B allows the isolated region to remain in fact as part of its special processing. At the time of further progress of the integration, the isolated region could be integrated depending on the situation.

[CONCRETE EXAMPLES]

The feature of this embodiment lies in executing the integration of the image regions through two or more different processes. The integration is executed on the basis of the color difference in the initial process A and then on the basis of the size of the region in the subsequent process B.

[Process A] Integration Based on Color Difference

Integration is performed in accordance with the method of the first embodiment. Each time the pixels (or regions) are integrated, the position and color number of the newly integrated region are compared with those of other regions, to repeat the integrating processing. With the increase in the number of times processing is repeated, the image would be integrated into a limited number of regions each having the same color. The problem here is how to judge the completion of the process A. It is conceived that two major judgment methods are available.

(1) Judgment by Color Difference

Each time the integrating processing is performed, a minimum color difference is retrieved between the regions existing at that point in time. When the minimum color difference reaches the reference value, the process A is terminated. In the NBS color difference unit, for instance, the color difference is evaluated as follows.

| Color Difference | Evaluation |
| --- | --- |
| 0.0~0.5 | substantially no difference in color |
| 0.5~1.5 | slight difference in color |
| 1.5~3.0 | considerable difference in color |
| 3.0~6.0 | remarkable difference in color |
| 6.0~12.0 | very remarkable difference in color |
| 12.0~ | belongs to another color |

It will depend on the design as to which color difference is to be employed as the reference value. If the image generally tends to have relatively large color differences among regions, a larger reference value may be employed. In this embodiment, the reference value is assumed to be 6.0, allowing the process A to cease in a state where the integration has not yet proceeded very far. The reason for this is that excessive progress of the process A would lead, e.g., to the production of unwanted images from the viewpoint of the subsequent motion coding.

Figure 7:
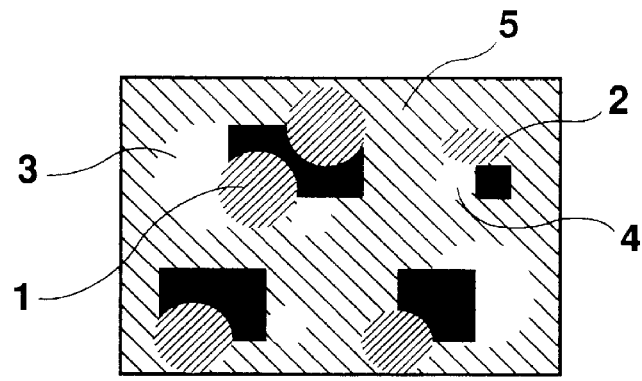
FIG. 7 is a view of an original image previous to integration of a third embodiment.
Figure 8:
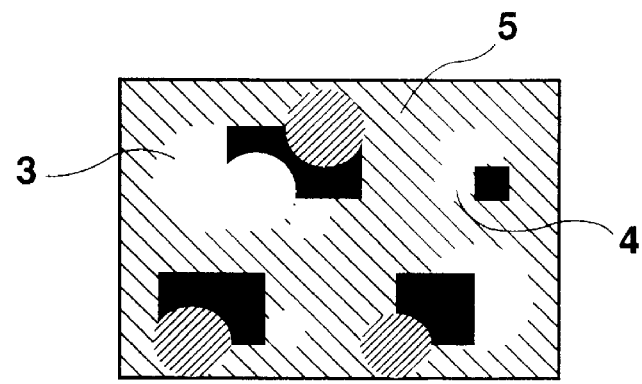
FIG. 8 is a view of an image subjected to the integration which has progressed to some extent in the third embodiment.
Figure 9:
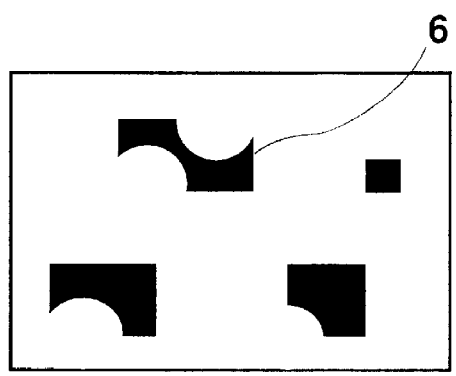
FIG. 9 is a view of the image subjected to the integration which has progressed significantly in the third embodiment.

Referring to FIGS. 7 to 9, there are depicted inconveniences which might be caused by the excessive progress of the process A. FIG. 7 illustrates an original image before the start of integration, in which there appear four major subjects having different geometries in a background region 5 hatched with rightwardly descending slanting lines. FIG. 8 illustrates the image which has undergone a degree of integration, and FIG. 9 illustrates the image which has undergone excessive integration.

<Change of Image from FIG. 7 to FIG. 8>

Providing that in FIG. 7 a small color difference exists between regions 1 and 2 shaded with rightwardly ascending slanting lines and white regions 3 and 4, the integration will be executed between the regions 1 and 3, and between the regions 2 and 4. Here, if the shaded regions are integrated into white regions, FIG. 8 would result. Although there are other regions shaded with rightwardly ascending slanting lines as well as the regions 1 and 2, they are not to be integrated into white regions due to their positions being far from the white regions.

<Change of Image from FIG. 8 to FIG. 9>

When the integration has proceeded to the state shown in FIG. 8, providing that the color difference diminishes between the background region 5 and the white regions, they will be integrated in the same manner. Also, if the background region is integrated into the white regions FIG. 9 would result, in which a white region appears so as to traverse the entire image.

Thus, the finally obtained image (FIG. 9) will merely allow show regions 6 and the like to be shown from the original image. However, the black regions have geometries quite different from those of the four subjects which initially existed on the original image, making it very difficult to perform, on the basis of the black regions, motion coding for each subject. Actual attempt to perform this coding would be impeded by a high possibility that corresponding regions are not to be found between the image frames (pictures), resulting in the necessity of retrying the integration from the beginning, or of judging the propriety of coding while returning the image little by little from FIG. 9 to the pre-integration state. Naturally, this would lead to complicated processing and lowered processing efficiency. In this embodiment, the moment the color difference reaches 6.0, the process A will be stopped early enough to avoid the inconvenience.

(2) Judgment by Situation of Regions

The above-described inconvenience could be represented as "the state where too large a region has been created". It is thus conceivable that the process A comes to an end when the number of regions having a predetermined size has reached a given value. The predetermined size can be e.g., an area corresponding to 1% of the full image, and the given value can be e.g., 10 to 20. It is natural that these values may vary depending on the images. Anyway, the shift to the process B at this point in time would ensure that thereafter smaller regions are integrated earlier, making it easy to avoid the state in which any region may rapidly expand in such a manner as to traverse the entire image.

It is envisaged that the final image of the process ordinarily lies within a range permitting human eyes to identify the original image by analogy. If the motion coding is omitted from consideration, it will be possible to complete the image integration processing without the process B.

[Process B] Integration Based on Region Size

Subsequently, through the process B, the existing regions will be integrated in sequence from one having a smaller size, namely, in the ascending order of size. The size of the region may be judged by, e.g. the number of pixels. The reasons for integrating smaller regions sooner are that the inconveniences of the process A should be avoided and that a larger region will occupy a larger proportion of area in the original subject. Since it is important for the motion coding to extract contours of the entire subject, it aims at correctly grasping the contours of the subject by integrating a smaller region into a larger region.

The processing in the process B is completed when the regions have become even in size to some extent. Generally even sizes of regions would reduce the importance of a step of comparing the sizes upon the matching of regions between two image frames. This will result in shortening the total processing time required for the motion coding. Since a long calculation time is usually needed for multi-to-multi correlation between the image frames, a curtailment of the comparison elements will have a significant effect.

Figure 10:
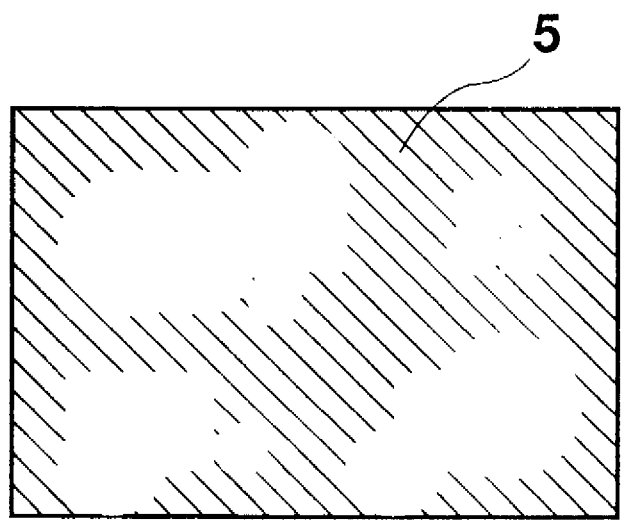
FIG. 10 is a view of the final image obtained as a result of process B of the third embodiment.

FIG. 10. depicts a final image obtained as a result of the process B, where at the time of FIG. 8 a shift has been effected from the process A to the process B. Through the process B, smaller regions will be integrated into other regions positionally closer thereto irrespective of colors, allowing the contours of the subjects to be shown against the remaining largest background region 5. Thus, a final image most appropriate for the motion coding will result.

The above is an outline of the process B, but it is desirable that particular consideration be given in the case of the presence of isolated regions within the image. The isolated regions will often be of greater significance or characteristic regions, and hence the order in which the isolating regions are integrated should be lowered, even though they have small areas. When the isolated regions are of little importance and, especially when their areas are extremely small (e.g., less than several pixels), the isolated regions may be subjected to integration.

This method may have following substitutes and variants.

[Process A]

1. The HVC uniform color space may be substituted by another color space, such as the RGB color space.

2. Since for the motion coding, the integration need not necessarily look natural to the human eye, other criteria may be employed for the integration, other than the color difference, such as brightness difference, chrominance difference, and luminance difference. It is envisaged for monochrome image that the integration by brightness difference is most typical.

3. As individual information of pixels, use may be made of information on the result of tracing by optical flow of each pixel. This arises from the fact that pixels whose tracing results show a similar tendency can often be integrated with each other.

4. Needless to say, these techniques can be combined.

[Process B]

1. The integration is developed in such a manner that positions of centers of gravity of regions remaining on the final image are appropriately dispersed. For instance, if the centers of gravity of all the regions are concentrated at the vicinity of the image center, the efficiency of region matching among a plurality of frames will be lowered. On the contrary, appropriately dispersed centers of gravity would facilitate the limitation of retrieval range of corresponding regions and would ensure a generally satisfactory matching result. Thus, if there are a plurality of candidates to be integrated, one should be selected which induces a result dispersing the positions of centers of gravity of the regions as much as possible after integration.

2. When a regularity is found among the patterns of appearance of a plurality of regions, those regions are to be integrated. For instance, if in an image there is a person wearing a black-and-white striped suit, mere integration by the color information would not make it possible to identify the contours of this person. Accordingly, in the case where black and white regions repeatedly appear with a certain regularity, those regions will be integrated. Besides the striped pattern, this is applicable to any regularity and need not be restricted to a regularity apparent to the human eye, and hence it would be possible to extract space frequencies from a relatively small region to thereby detect minute textures or minute patterns.

3. Regions coinciding with an image pattern prepared in advance are to be integrated into one. In the case of a visual telephone, for instance, it is envisaged that a human face is centered, and hence if a flesh-colored region with two black regions (eye) lying therein is located in the central portion of an image, these regions will be integrated into one as a face. This would be beneficial for image-to-image matching with respect to the movement of a person, and could be applicable to model base coding. It is to be noted that, for instance, when the face turns without moving horizontally or vertically, the importance of the information relating to the eyes will increase. In this case, the eyes can remain as isolated regions without being integrated into the region of the face.

4. If a dynamic image is the object, past status of region integration should be referred to. The integration of the regions carried out for the most recent image frame may often remain effective for the next frame.

5. In order to prevent the regions from becoming complicated in shape, the integration is progressed so as to eliminate unevenness. Complicated geometries would increase the number of regions to be removed from candidates as errors, merely in view of the geometries, upon matching. This might lead to a risk of failing to overlook the optimum matching.

6. These techniques may be combined.

According to the present invention described above, use of at least two processes makes it possible to perform image integration in consideration of motion coding. These processes will be particularly effective if they allow processing to be performed on the basis of individual information of pixels and aggregate information, respectively. Moreover, the execution of the processes A and B in the mentioned order would facilitate the avoidance of generation of an unwanted region which may, e.g., expand over the entire image.

Providing that through the process A, a plurality of regions in close vicinity to one another are subjected to the integration in sequence from one having a smaller color difference, namely, in the ascending order of color difference, the integration of regions with e.g., belong to the same subject will be facilitated. Providing that through the process B, a region having a smaller size is integrated into another region having a larger size in sequence, namely, in the ascending order of size, there will be a strong possibility that regions which are important as subject information may finally remain intact, making it possible to create an image appropriate for the motion coding.

Given that the process A continues until the minimum color difference among regions reaches a reference value and thereafter is succeeded by the process B, inconveniences which may be caused by excessive execution of only the process A, will be easy to overcome. This will also have a beneficial effect on the motion coding.

Similarly, given that the process A continues until the number of regions having a predetermined size reaches a certain value and thereafter is followed by the process B, the generation of an unwanted and too large region will be suppressed, making it easy to eliminate the above inconveniences.

If the order in which the isolated regions are integrated is lowered in the process B, the regions which are important as image information can continue to be carried up to the final image.

Embodiment 4

The fourth embodiment discloses a region-based image processing method and apparatus associated with coding of final images or intermediate images obtained by the first embodiment.

[Background]

Figure 11:
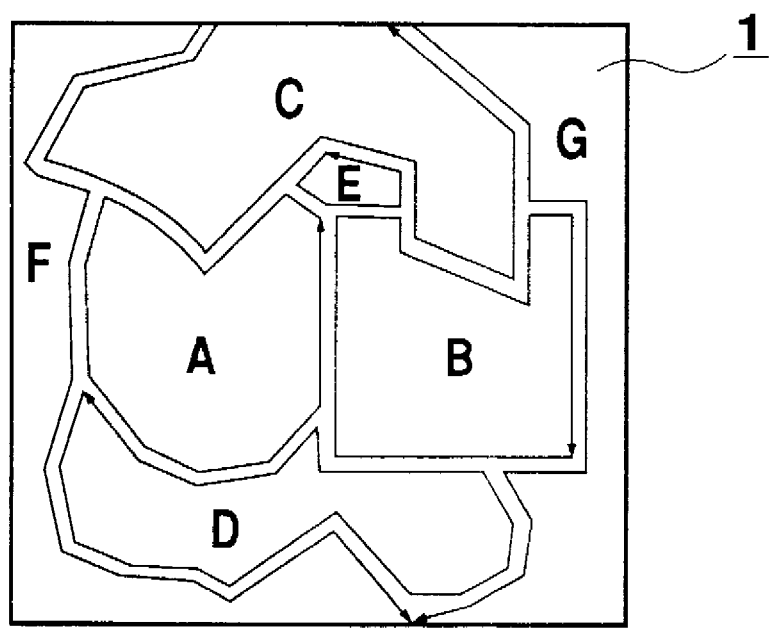
FIG. 11 is a diagram showing a method of specifying image regions by a segmentation method.

Referring to FIG. 11, there is depicted a diagram showing a method of designating image regions by a segmentation method. As shown, an original image 1 is divided into regions A to D, representative of four subjects, and their background regions E to G. The segmentation method can be, for instance, a clustering or region development method. However, it is possible to use any method.

The image is coded using a small amount of data to define the positions and the contents of the regions A to G. The definition of positions will be usually given by drawing a peripheral line of each region and by describing coordinates of pixels constituting the line. In FIG. 11, the peripheral line of each region is indicated by a line having an arrow.

[Problems]

The above coding will enable each region to be defined as a plane by its peripheral line. The reason is that the regions and the peripheral lines are one-to-one correlated with each other, each region being described in a closed manner, without exception, by the peripheral line. However, this method has room for improvement in the following aspects.

(1) Efficiency of Coding

Two peripheral lines are shown extending in parallel with a slight interval therebetween, allowing the boundary between the regions to be defined twice in total. This would lead to a poor coding efficiency.

(2) Response upon Movement of Regions

If the region A moves, it is natural that the shapes and areas of the region B and other regions adjoining thereto also vary. In the case of trying to represent the movements and variations of the regions on a region basis, however, inconveniences may occur that a place hitherto covered by the thus moved region unexpectedly results in a vacant region, encountering a lack of information, or that the adjacent regions are displaced with respect to each other or overlap each other.

[Object of This Embodiment]

The object of this embodiment is to disclose a method of coding image regions without using information relating to peripheral lines. Further disclosed is an image coding apparatus utilizing a fact that this method has a strong affinity with the actual image processing hardware. Provided through such disclosure is, for instance, a technique required by MPEG4 which may be a future standard, in other words, a basic technique for coding dynamic images at lower bit rate in real time.

[Solution]

The image coding method of this embodiment is characterized in that the image regions are coded in accordance with information of border lines between regions, instead of the peripheral line information for each region.

More specifically, this method comprises, for instance, a step of scanning an image in a given direction, a step of detecting points constituting a boundary between regions and resting on the scanning line, and a step of joining the detected border points to create a border line. In this case, "boundary between regions" represents, for instance, a boundary between the regions A and B in FIG. 11, and includes all the boundaries among the regions formed by dividing the image by any method. The dividing of the region can be performed by, e.g., color information or movement information. It is to be understood that since the image can be originally constituted by region information, like an animated image, this embodiment is not necessarily intended to be applied to an image which has undergone segmentation.

An image is first scanned to find border points between regions. These border points are then joined in sequence to create a border line. At that time, it is desirable to record which regions the original border points belong to. For instance a border line defined between the regions A and B is different from a border line defined between the regions A and C, and that the border points constituting these two border lines are not to be confused with each other.

Furthermore, it is envisaged in this embodiment that the border points are classified depending on the significance so that the border points having predetermined significance can represent the border line, thereby compressing the information on the border line. The significance can be determined on the basis of some features. For instance, a border point having a geometric feature on a border line (hereinafter, referred to as a "feature point") can be of greater significance. An example of the feature point is two end points of the border line. This would enable a border line to be defined by only two points, and eliminate the necessity of defining the other points on the border line, thus allowing the information to be compressed into these two points.

It is conceivable in this embodiment that the region may be divided on the basis of color information (color number, luminance, brightness, etc. in a color space) and that the border line may be produced by joining points at which the color information varies. In this case, the border line information will include, for instance, positional information on the border line as well as the color information on regions lying on both sides of the border line. This color information will enable the original image region to be decoded.

It is further envisaged in this embodiment that the border lines may be classified in accordance with the significance so as to be able to integrate the information on the border lines having less significance. It is to be particularly noted that "integration" referred to hereat represents the compression of information with the curtailment of the actual number of border lines and that it differs form mere compression to be performed while maintaining the number of border lines. "Significance" means, for instance, a degree strongly affecting quality of images when the images are decoded, and it is envisaged that if the border line is a straight line, the longer the border line is, the greater the significance becomes. Accordingly, integrated herein is the border line information less influential on the quality of the images.

Furthermore, in this embodiment, the arrangement may be such that when colors of the regions lying on both sides of the border line are analogous, these regions are integrated in advance for the subsequent coding. It is to be appreciated that "integration" referred to here means compression of information with the curtailment the actual number of regions and that it differs from mere compression to be performed while maintaining the number of regions. "Colors are approximate " will represent, for instance, the state where a color difference is not more than a certain value as well as the state where within a given distance lie the relative positions in the HVC color space. Providing that for instance, the color of the region A is approximate to that of the region B in FIG. 11, the two regions will be integrated into one region A+B.

At that time, for instance, the colors of the regions lying both sides of the border line may be defined as average colors of the respective regions (or intermediate values of the pixels). Closer average colors would allow the two regions to be integrated.

According to another aspect, the colors of the regions on both sides of the border line may be judged on the basis of the colors of points resting in the vicinity of the border line. This is because even though the average colors of two regions are largely different from each other, the integration of the two regions may possibly be natural as long as the colors i the vicinity of the border line vary smoothly. The points in the vicinity of the border line may be, for instance, a plurality of representative points lying along the border line at certain intervals, and in this case, an average color (an intermediate value) of these points may be employed.

When two regions have been thus integrated, this embodiment may allow the integration of a plurality of border lines capable of being integrated. In the case of the above example, a border line defined between the regions A and B will first disappear. At this point of time, separately remains a border line defined between the regions A and D and a border line defined between the regions B and D, but these two border lines can be integrated to be a single border line. The thus obtained single border line might be subjected to the above-described compression by the feature points, thereby making it possible to further curtail the amount of information.

The image coding apparatus of this embodiment, on the other hand, comprises means for the input of images; means for scanning the input images in a predetermined direction; means for detecting border points of image regions on the scanning line; and means for generating border lines by joining the detected border points. Images received by the receiver, e.g., will be scanned in the order of reception, whereby border points will be found e.g., for each line. Afterwards, these border points are joined together to create border lines. In response to the border line information thus created, the region information of the image will be coded.

[Concrete Examples]

This image coding method works well on images which have undergone segmentation to some extent. The object is, by way of example, the final image or intermediate image obtained in the first embodiment. FIG. 11 depicts an image thus obtained, for instance. Description will be given of a processing procedure for this image (referred to as "input image") hereinbelow.

[1] Scanning

Input data are scanned in a given direction. "A given direction" includes horizontal, vertical, or any other direction. In this case, on the assumption that image data are input serially in line units, it would be a horizontal direction. The scanning of the input data in the order in which the data have been input would simplify the hardware configuration, which will in turn provide a greater total throughput. Since the input images have already been described by color numbers, the color numbers are read in sequence from the beginning in line units, and are then traced by software.

[2] Detection of Border Points

A pixel is detected whose color number varies, the pixel being defined as a border point. It will depend on the software design as to which pixel, i.e., immediately before or immediately after the variation, should be regarded as the border point.

Referring to FIG. 12, there are depicted color numbers of pixels belonging to lines L0 to L2 of the input image. These pixels each carry a color number a,b, or c. In this case, the border points are pixels lying immediately after the variation which are hatched. Supposing that coordinates of a pixel are generally represented in the form of (line, column), the border points will be written as (0,4), (1,3), etc.

[3] Generation of Border Lines

Border lines are generated by joining the thus detected border points in sequence. As can be seen from FIG. 12, two border lines are generated, that is, a border line BL1 containing (0,4), (1,3), (2,3), and a border line BL2 containing (0,10), (1,10), (2,9).

At that time, consideration is required to avoid any confusion of the border points which belong to a different border line. Attention should be paid to the following two points.

1. Variations of Color Numbers

At BL1 the color numbers vary from a to b. Conversely, if a change other than this occurs, this border point will not belong to BL1, and hence is not allowed to be associated with BL1.

2. Mutual Positions of Border Points

Should a border point inducing the variation from a to b exist, the border point must be rejected unless it is located at a position capable of constituting BL1. More specifically, the border points may be considered to belong to the same border line only when the columns containing the border points are coincident with each other or sufficiently close to each other in the adjacent lines. In FIG. 12, the difference in column between (0,4) and (1,3) is merely 1, and (1,3) and (2,3) reside on the same column. In view of the noise or the like of the input images, these border points could be considered to be contained in the same border line only when the difference is not more than 3, for instance.

[4] Coding of Image Information

At the time when each border line has become defined, border line information will be employed as image coding information. A format of the information can be given, for instance, as follows.

| Border Line | Constituent Border Points | Variation of Color Number |
|---|---|---|
| BL1 | (0,4), (1,3), (2,3) | a, b |
| BL2 | (0,10),(1,10),(2,9) | b, c |

One border line can be represented by coordinates of border points constituting the border line (hereinafter, referred to as "constituent border points") and two color numbers which vary on the border line (aligned in the scanning direction). It is to be noted that the BL1 may be defined, e.g., by a chain code with the start point (0,4). This is a method in which the direction of the following point when viewed from a certain point is numerically represented.

For instance, if

| | | | |
|---|---|---|---|
| upper left: 1, | left: 2, | lower left: 3, | bottom: 4 |
| lower right: 5, | right: 6, | upper right: 7, | top: 8 | are specified, then BL1 will be chain coded starting from (0,4) toward (3,4 . . . ).

The above is an outline of the fourth embodiment. According to this embodiment, a double definition of the boundary portion, which may be a problem in coding using the conventional peripheral line information, will be eliminated. Also, since the region movement is represented in the form of the border line movement, it would be impossible in principle to allow the occurrence of a vacant region among the regions or of displacement or overlap between the regions.

It is envisaged that this embodiment allows the following application or modification.

(1) Image Configuration

Although a case has been hitherto described in which the input image has undergone region division in advance, this embodiment would be effective irrespective of the division, if images originally composed of region information, such as animated images, are envisaged.

2) Mode of Image Input

Although it is assumed herein that the input of each pixel is executed after the transformation into the color number, the original image might be input intact. In this case, an optical scanner could be used for scanning of the original image and to acquire boundary information mainly associated with the color information.

(3) Mode of Pixel Representation

Each pixel might be represented by attributes other than the color number. Luminance, brightness and the like would be available.

(4) Preliminary Integration of Regions

With the closer color numbers imparted to the regions lying on both sides of the border line, these regions might be integrated before coding. In the case of FIG. 12, if the value of |a−b| lies within a predetermined range, namely, if the color difference is small, these regions might be integrated and the color numbers of all the pixels within the region might be substituted by a, b, or |a−b|/2. Subsequent generation of the border line would no longer allow the appearance of the border line BL1, which will contribute to an enhanced coding efficiency.

Embodiment 5

In the fifth embodiment, the border line information obtained in the fourth embodiment is further compressed. Although in the fourth embodiment the border line has been described by all the constituent border points, in the fifth embodiment feature points are selected from among these border points for classification, so that the border line is represented by only the feature points required. The feature points can be:

(0) both terminal ends of a line segment contained in the border line and have a length less than a predetermined value;

(1) both terminal ends of a line segment contained in the border line and having a length exceeding the predetermined value;

(2) points on which the sign of gradient of the border line changes; and (3) both terminal ends of the border line.

Defined by this classification are four ranks of processing as follows.

[Rank 0] The border line is described by all of the feature points given by the above (0) to (3);

[Rank 1] The border line is described by the feature points given by the above (1) to (3);

[Rank 2] The border line is described by the feature points given by the above (2) and (3); and

[Rank 3] The border line is described by only the feature points given by the above (3).

The degree of compression will be increased in the descending order of rank.

Figure 13:
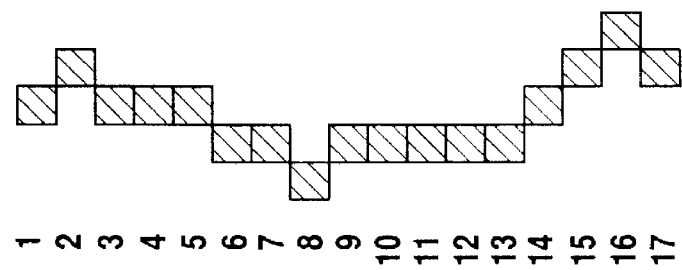
FIG. 13 illustrates the state with no processing, among diagrams showing processing by respective ranks of a fifth embodiment.

Referring to FIGS. 13 to 17, processing executed by respective ranks is illustrated, FIG. 13 showing the case of no rank processing, and FIG. 14 to 17 each showing the case of processing of rank 0 or below. In the diagrams, pixels are represented by squares, with a series of pixel numbers given in the margin for the explanation. Hatched pixels designate pixels which will remain after respective processing. Each rank processing will be described in the ascending order of rank.

[Rank 3]

Figure 17:
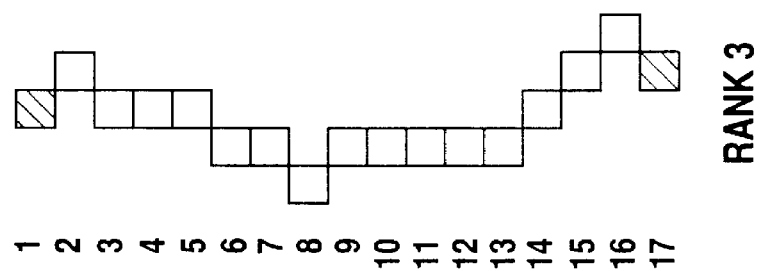
FIG. 17 illustrates the result of rank 3 processing of the fifth embodiment.

As is apparent from FIG. 17, only pixels 1 and 17 only remain. The border line information is represented by the coordinates of the two pixels and the color numbers of the two regions associated respectively with the two pixels. Decoding this would allow the border line to result in a straight line joining the two terminal ends.

[Rank 2]

Figure 16:
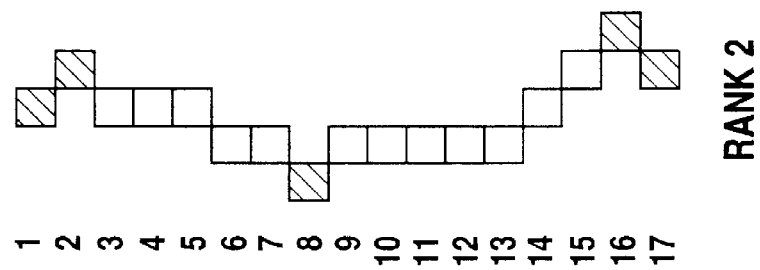
FIG. 16 illustrates the result of rank 2 processing of the fifth embodiment.
Figure 15:
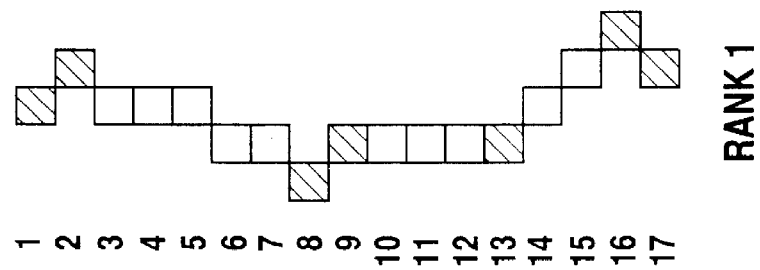
FIG. 15 illustrates the result of rank 1 processing of the fifth embodiment.

As shown in FIG. 16, pixels 2, 8, and 16 also remain. The gradient of the border line is defined hereat to be 0 for a vertical direction in the diagram, positive for a rightwardly ascending direction, and negative for a rightwardly descending direction. The gradient between the images 1 and 2 is negative, and the gradient between the images 2 and 3 is positive, with the result that the pixel 2 will be a point to be found. The same applies to the pixels 8 and 16. Decoding this would allow the border line to result in a line with turns joining, in sequence, the pixels 1, 2, 8, 16 and 17 in the mentioned order. It is to be noted that the definition of the gradient is not limited to this example. Depending on the image to be processed, a convenient direction could be defined as the gradient 0.

[Rank 1]

Let a predetermined length be four pixels. As is clear form FIG. 15, due to the presence of five pixels for the pixels 9 to 13, and four pixels at an angle of 45 degrees for the pixels 13 to 16, the pixels 9 and 13 will additionally remain. The pixel 13 is located at an intersection of the two line segments and hence is selected twice. The pixel 16 will be selected twice, in the ranks 2 and 1, respectively.

[Rank 0]

Figure 14:
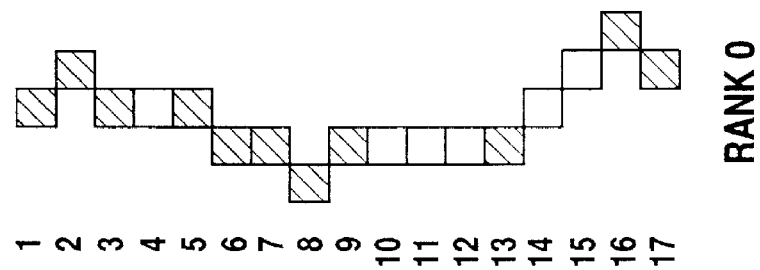
FIG. 14 illustrates the result of rank 0 processing of the fifth embodiment.

As can be seen from FIG. 14, both the terminal ends of two remaining line segments, that is, the pixels 3, 5, 6, and 7 will additionally remain.

The use of rank 3 would allow the original 17-pixel information to be represented by only two pixels, and hence would increase the compression rate. The rank can be determined in view of the balance between the compression rate and the quality of images obtained upon decoding. In principle, it is convenient to extract a long straight line segment to allow a high compression rate. For instance, the pixels 4 to 8 in FIG. 13 have a regularity that for every descent of two pixels, a leftward shift of one pixel occurs, which could be regarded as a straight line. It is to be appreciated that the direction of the straight line need not be limited to vertical, horizontal, or slanting at 45-degrees, and that the width to be regarded as a straight line could also be sufficiently larger than the width of one pixel. It is envisaged that in any case, line segments are also considerably characteristic portions i the original image, and hence it would be significant to perform a compression of information while paying attention to those portions.

The foregoing is the compression of the border line information using the fifth embodiment. It is to be noted in this embodiment that it would be necessary to take into consideration the influence of the preliminary integration of the regions, which has been described in the fourth embodiment.

Figure 18:
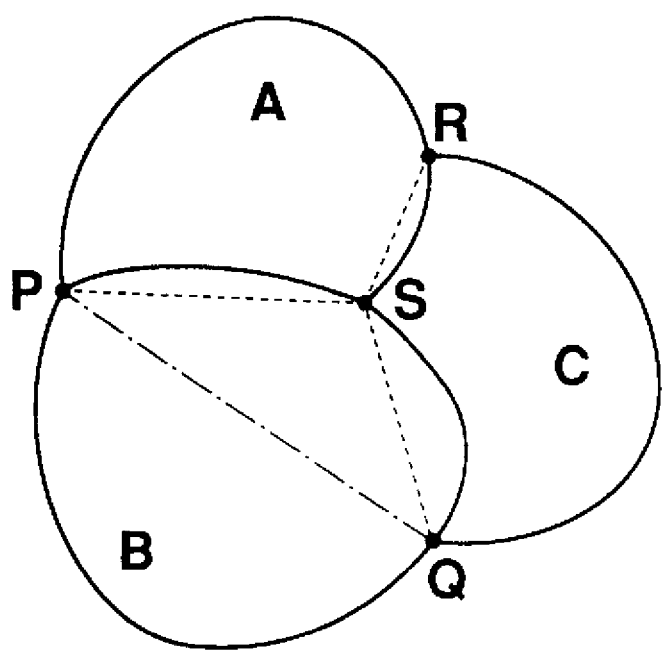
FIG. 18 is a diagram showing a relationship between preliminary integration of regions and the rank processing.

Referring to FIG. 18, there is depicted a relationship between the preliminary region integration and the rank processing. Three regions A, B and C are contained in FIG. 18 in which, using border points P to S, border lines between the regions A and B, B and C, and C and A are respectively represented as curved lines PS, QS and RS. Under such a condition, the execution of the processing of, e.g., the rank 3 would allow the respective border lines to result in broken lines PS, QS and RS.

Assuming that the regions A and C have been preliminarily integrated together, the border lines will be allowed to remain only between a region (A+C) and the region B, resulting in curves PS and SQ. At this point in time, there is no need to leave two border lines between the region (A+C) and the region B, so that the two border lines are integrated into a single fresh border line, that is, a curve PSQ. Subsequent execution of the rank 3 processing would allow the border line to result in a dot and dash line PQ as shown in FIG. 18. It is to be noted for the execution of the fifth embodiment that the preliminary integration of the regions would enable the border line information to be further compressed and integrated.

Embodiment 6

The fifth embodiment aimed at compressing the border line information by, so to speak, ranking the individual border points. In the sixth embodiment, the border lines themselves are ranked according to significance, allowing the integration of low-rank border line information. It is to be noted that this integration will entail the curtailment of the actual number of border lines, which differs from the compression performed in the fifth embodiment.

The sixth embodiment uses the length of each border line as the significance. Depending on whether the length is not less than or less than a predetermined value, the border lines are grouped into two ranks, that is, rank X for higher significance and rank Y for lower significance.

Figure 20:
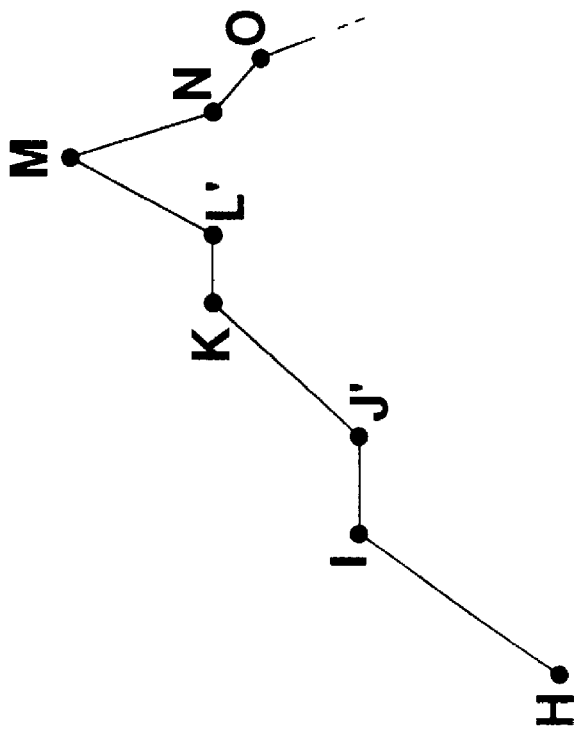
FIG. 20 is a diagram showing the ranks of the border lines and the state of integration, particularly depicting the state after the integration of the border lines of rank Y.
Figure 19:
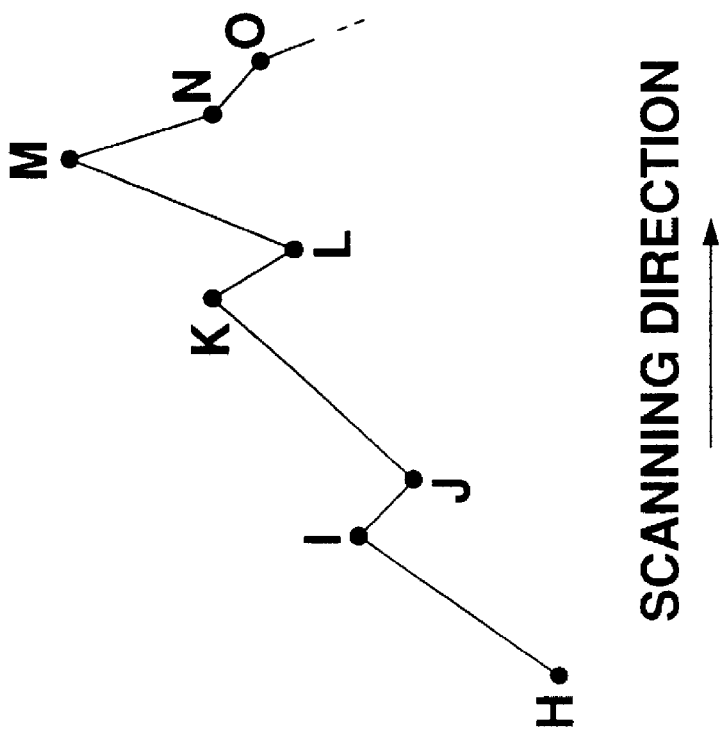
FIG. 19 is a diagram showing the ranks of border lines and the state of integration, in which a plurality of border lines HI, IJ, etc., are joined together to generally present a zigzag line.

Referring to FIGS. 19 and 20, the border line ranks and the state of integration are depicted. In FIG. 19, a plurality of border lines HI, IJ, etc., are joined together so as to generally present a zigzag line. FIG. 20 illustrates the state after the integration of the border lines of the rank Y. It will be appreciated that the plurality of border lines divide the overall regions of FIGS. 19 and 20 into upper and lower regions.

It is to be noted in FIG. 19 that despite the presence of only the two regions, the border lines consist of a plurality of separate border segments instead of a single continuous line extending from H to O. This is because the scanning is performed in a given direction upon the detection of the border lines, and rightwardly ascending borders (for instance, the HI portion) and rightwardly descending borders (for instance, the IJ portion) are generated as separate border lines. Now assume that IJ, KL, and NO of these border lines fall under the rank Y, with the others falling under the rank X.

[Processing for Border Line IJ]

Now if it is intended that the rank Y information should be integrated (or deleted), the information on the border points resting on the border line IJ is deleted. Since on the contrary, the information on the border line JK should be retained, on the assumption that the information might be reutilized, it would be undesirable to simply join I to K by a line.

In this case, the information on the border line IJ is merely deleted. This would ensure that the nature of the scanning line is implicitly utilized to obtain an output which gives the appearance that the point J has moved to the point J' (the direction of the border line IJ' will coincide with the scanning direction).

The direction of the border line IJ' is coincident with the scanning direction. If the point J had existed at the position of the point J' from the beginning, this point would not be detected as a border point as long as the border detection of this embodiment is employed. This is due to the fact that the point I is superimposed on the point J' when viewed from the scanning direction, the latter being concealed by the former. Therefore, the border line J'K could be defined as a line obtained by joining the point K to a point (designated as J") which lies on the border line J'K and is shifted by one line from the point J' towards the point K. This definition would be necessary and sufficient. The present embodiment will not need the information on the border line IJ'. Reversely, mere deletion of the information on the border line IJ would allow the point J to automatically move to the point J'. Thus, the following two effects are obtained.

1. No Calculation Step

The automatic movement of the point J to the point J' will not require a calculation step.

2. Compression Effect by Integration

This arises from the deletion of the information on the border line IJ. The representation of information using the border lines, and the nature of the scanning line, will give rise to the compression effect.

The above is the processing for the border line IJ. As a matter of fact, there are several border lines even when there are only two regions as shown in FIG. 19, which means that it would be extremely desirable to delete the border lines.

Figure 21:
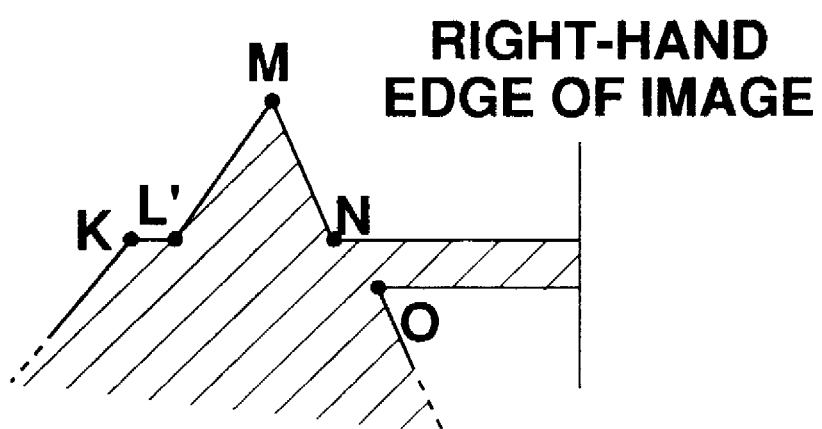
FIG. 21 is a diagram depicting the state of an decoded image in the case of deletion of information on the border line NO.

The border line KL could be subjected to the same processing, whereas the border line NO will need special consideration. The reason for this is that the point O has no point corresponding to the point J" for the point J. FIG. 21 is a view of the state of a decoded image in the case where the information on the border line NO has been deleted, which shows that more deletion of information might give rise to problems. The removal of the border line NO will lead to the formation of two horizontal lines extending form the points N and O up to the right-hand edge of the image, consequently allowing the original region to expand into the thus newly formed region.

In order to overcome this problem, upon deleting a border line n contained in one border line BL, it will be judged in the sixth embodiment that the deletion is possible, if (1) when translating the border line n in the scanning direction, (2) the entire border line n again intersects with the border line BL. It is certain that the border line n satisfying such conditions, even through deleted, will allow the border line to be successfully closed at the position intersecting again with the border line BL, whereby the above problem can be overcome. In conformity with FIG. 21, this judgment method may be described as follows. When viewed horizontally leftward from the right-hand edge of the image, visible border lines, even partial ones, are not to be deleted, while it is possible to delete the other border lines.

Embodiment 7

The fourth to sixth embodiments described hereinabove will also reveal the outline of an image coding apparatus of this embodiment.

Figure 22:
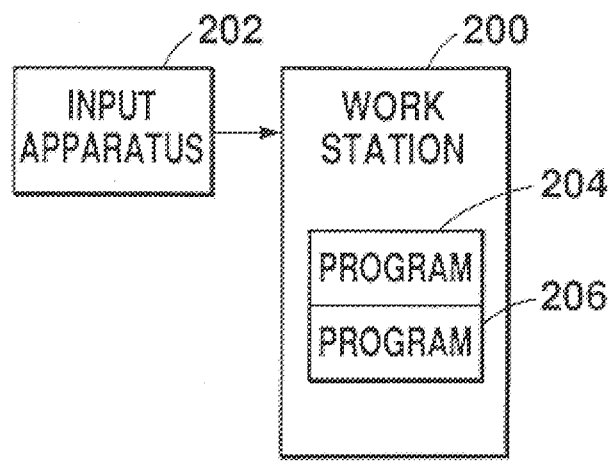
FIG. 22 is a diagram depicting a schematic configuration of an apparatus of a seventh embodiment.

Referring to FIG. 22, illustrated a configuration of this apparatus is schematically, which comprises:

(1) a work station 200 for executing the majority of the processing;

(2) an input apparatus 202 for inputting images to be processed, the apparatus including a camera, an image reproducing apparatus, an image receiver, or a storage device in which images have already been stored;

(3) a program 204 for scanning the images input, or a scanner; and (4) a program 206 for detecting boundaries of image regions to produce border lines. The action will be substantially the same as described in the fourth to sixth embodiments.

Figure 23:
FIG. 23 is a view of a halftone image appearing on a display, showing the result of coding by an image coding method of the seventh embodiment.
Figure 24:
FIG. 24 is a view of a halftone image appearing on the display, showing the result of coding by the image coding method of the seventh embodiment.

Referring finally to FIGS. 23 and 24, there are depicted photographic images showing the results of processing according to this embodiment. Under the experimental conditions that the number of divided regions of the input image is 2000, FIGS. 23 and 24 show images decoded after the processing by rank 0 and rank 3, respectively, of the fifth embodiments.

With the number of pixels of the original image being 21684, the number of border points which have remained as a result of the processing of the rank 0 was 9026, and the number of the remaining border points for rank 3 was 8808. As compared with the case of leaving all of the border points as information, compression of several ten percent has already been realized at the stage of rank 0. At that time, it was found that the deterioration in the quality of the image is not particularly noticeable. Naturally, the decrease in the number of divided regions will lead to an increase in the compression efficiency.

What is claimed is:

1. A method of processing images on a region basis, said method comprising:
   a step for dividing a uniform color space into a plurality of regions, a representative color being imparted to each of the regions;
   a step for imparting a representative color to each portion of the image;
   a judgment step for judging, based on region identifying information of the representative color of each portion of the image, whether or not representative colors of each portion of the image are arranged in a same region or adjacent regions in the uniform color space; and
   a step of integrating the portions of the image when the representative colors thereof are judged as being arranged in a same or adjacent regions in the uniform color space and the portions are adjacent in the image; wherein:
   region identifying information is imparted to each representative color so as to represent positional relationship between the divided regions.

2. A method according to claim 1, wherein
   said step for imparting uses a color table of the representative colors, and
   the portion is an image pixel.

3. A method of processing images according to claim 2, wherein the color of each pixel is replaced with an element, among elements of said color table, which minimizes a color difference relative to the color of said each pixel.

4. A method of processing images according to claim 2, said method further comprising:
   a color table creation step for extracting, upon the completion of the processing of an image by said integration step, elements of said color table which are necessary to represent its final image, to create another color table.

5. A method of processing images according to claim 1, said method further comprising:
   a recognition step for recognizing, upon the completion of the processing of an image by said integration step, a significance of each integrated region, in conformity with the result of the integration.

6. A method of processing images according to claim 1, wherein
   each processed region is coded by information on border lines between said regions, not be information on a peripheral line which independently defines the region.

7. A method of processing images according to claim 6, comprising the steps of:
   scanning an image in a given direction;
   detecting, on a scanning line, a plurality of border points constituting a border between regions; and
   joining said plurality of border points detected to generate border lines; wherein
   information on image regions is coded in accordance with information on said generated border lines.

8. A method of processing images according to claim 7, wherein
   said plurality of border points are classified depending on their significance so that said border lines are represented by a plurality of border points having predetermined significance to consequently compress information on said border lines.

9. A method of processing images according to claim 7, wherein
said regions are divided in accordance with color information so that a plurality of points at which said color information varies are joined together to consequently generate said border lines.

10. A method of processing images according to claim 9, said information on said border lines including:
    positional information on said border lines; and
    color information of regions lying on both sides of said border lines.

11. The method of claim 1, wherein the uniform color space is an HVC uniform color space.

12. The method of claim 1, wherein said step for integrating is performed without a calculation of a distance between the regions.

13. The method according to claim 1, wherein colors corresponding to two adjacent points in the uniform space appear similar to each other as recognized by normal human vision.

14. The method according to claim 1, wherein the region identifying information is a color number.

15. An image communication apparatus comprising a transmitter for transmitting image data and a receiver for receiving said image data:
    said transmitter including:
       a judgment section for judging an approximation between a color of each pixel constituting an image to be processed and elements of a color table;
       a replacement section for replacing, in accordance with the result of said judgment, the color of each pixel with an element of said color table;
       an integration section for integrating, after said replacement, said pixels into regions according to their colors; and
       a color table creation section for extracting, upon the completion of the processing of an image by said replacement section and said integration section, elements of said color table which are necessary to represent a final image, to create another color table:
    said receiver including:
       a memory for storing said another color table transmitted from said transmitter; wherein
       prior to the communication of said image data, said transmitter and said receiver hold a common color table;
    said transmitter further including:
       a recognition section for recognizing, upon the completion of the processing of an image by said replacement section and said integration section, a significance of each region, in conformity with the result of the integration; and
       a decision section for deciding, depending on the significance recognized, a number of times that data for that region are transmitted;
    said a receiver further including:
       a reproduction section for combining data for each region transmitted from said transmitter to reproduce an image.

16. A method of processing images on a region basis, the method comprising:
    a judgment step for judging an approximation between a color of each portion of an image to be processed and element colors in advance;
    a replacement step for replacing, in accordance with the result of said judgment, the color of each portion with an element color; and
    a step for integrating, after said replacement step, portions into regions according to their colors, wherein a single color replaced with an element color by said
judgment step and said replacement step is imparted to
said portions integrated in the step for integrating,
wherein each processed region is coded by information on border
lines between said regions, not be information on a
peripheral line which independently defines the region,
and said border lines are classified depending on their significance so as to integrate said information on said border lines having less significance.

17. A method of processing images on a region basis, the method comprising:

a judgment step for judging an approximation between a color of each portion of an image to be processed and element colors in advance;

a replacement step for replacing, in accordance with the result of said judgment, the color of each portion with an element color;

a step for integrating, after said replacement step, said portions into regions according to their colors, wherein a single color replaced with an element color by said judgment step and said replacement step is imparted to said portions integrated in the step for integrating:

scanning an image in a given direction;

detecting, on a scanning line, a plurality of border points constituting a border between regions; and joining said plurality of border points detected to generate border lines, wherein each processed region is coded by information on border lines between said regions, not be information on a peripheral line which independently defines the region, said regions are divided in accordance with color information so that a plurality of points at which said color information varies are joined together to consequently generate said border lines, said information on said border lines including:

positional information on said border lines; and color information of regions lying on both sides of said border lines, and wherein if colors of regions lying on both sides of said border lines are analogous, said regions are integrated in advance and then coded.

18. A method of processing images according to claim 17, wherein said colors of said regions lying on both sides of said border lines are judged on the basis of respective average colors of said respective regions.

19. A method of processing images according to claim 17, wherein said colors of said regions lying on both sides of said border lines are judged on the basis of colors of points in the vicinity of said border lines.

20. A method of processing images according to claim 17, wherein when two regions are integrated, said border lines capable of being integrated are integrated into a single border line.

21. An image processing method for coding images on a region basis, comprising:

inputting an image;

scanning, in a given direction, said input image;

detecting, on a scanning line, a plurality of border points between image regions; and joining said plurality of detected border points to thereby generate border lines, wherein information on said image regions is coded in accordance with information on said generated border lines, said plurality of border points are classified depending on their significance so that said border lines are represented by a plurality of border points having predetermined significance to consequently compress information on said border lines, and wherein said border points have predetermined significance selected from the following:

both end points of a line segment having a length of less than a predetermined value in a border line, both end points of a line segment having a length over the predetermined value in a border line, points at which signs of gradient of a border line change, and both ends of a border line.

22. An image processing method according to claim 21, wherein said border lines are classified depending on their significance so as to integrate said information on said border lines having less significance.

23. An image processing method according to claim 21, wherein said regions are divided in accordance with color information so that a plurality of points at which said color information varies are joined together to consequently generate said border lines, said information on said border lines including positional information and color information of regions lying on both sides of said border lines, the method further comprising integrating said regions prior to being coded if colors of regions lying on both sides of said border lines are analogous.

24. An image communication apparatus comprising a transmitter for transmitting image data and a receiver for receiving said image data:

said transmitter including:

a judgment section for judging an approximation between a color of each portion of an image to be processed and element colors prepared in advance;

a replacement section for replacing, in accordance with the result of said judgment, the color of each portion with the element colors;

an integration section for integrating portions into regions according to their colors;

a recognition section for recognizing, after the completion of the processing by said replacement section and said integration section, a significance of each integrated region, in conformity with the result of the integration; and a decision section for deciding, depending on the significance, a number of times that data for that region are transmitted, said receiver including:

a reproduction section for combining data for each region transmitted from said transmitter to reproduce an image.

25. A method of image processing on a region basis, said method comprising:

partitioning a uniform color space into a plurality of divided regions;

associating each region with a representative color; and integrating portions of the image having colors associated with representative colors of the same or adjacent region based upon a color difference between a color associated with each portion in the original image and a representative color of said divided region and being adjacent in the image.

26. The method according to claim 25, wherein colors corresponding to two adjacent points in the uniform space appear similar to each other as recognized by normal human vision.

27. An image processing method for coding images on a region basis, comprising:

inputting an image;

scanning, in a given direction, said input image;

detecting, on a scanning line, a plurality of border points between image regions; and joining said plurality of detected border points to thereby generate border lines, wherein information on said image regions is coded in accordance with information on said generated border lines, wherein said regions are divided in accordance with color information so that a plurality of points at which said color information varies are joined together to consequently generate said border lines, wherein said information on said border lines includes positional information and color information of regions lying on both sides of said border lines, wherein if colors of regions lying on both sides of said border lines are analogous, said regions are integrated in advance and then coded.

28. An image processing method for coding images on a region basis, comprising:

inputting an image;

scanning, in a given direction, said input image;

detecting, on a scanning line, a plurality of border points between image regions; and joining said plurality of detected border points to thereby generate border lines, wherein information on said image regions is coded in accordance with information on said generated border lines, and said border lines are classified depending on their significance so as to integrate said information on said border lines having less significance.

29. A method processing images comprising the steps of:

assigning an image representative color to a portion of an image;

presenting a uniform color space divided into a plurality of regions;

assigning a space representative color to each region in the color space where the space representative color for each such region is unique;

uniquely relating each particular image representative color to one space representative color such that each image representative color has a corresponding space representative color;

determining for the image representative color of each adjacent portion of the image whether its corresponding space representative color is positioned within a predetermined region in the color space; and integrating the adjacent portions of the image for which their corresponding space representative colors are positioned within the predetermined region.

* * * * *